United States Patent [19]

Dahlgren

[11] 3,774,114

[45] Nov. 20, 1973

[54] DECODING DEVICE FOR TONE SEQUENCE CODES

[75] Inventor: Jan-Åke Dahlgren, Alvsjo, Sweden

[73] Assignee: Sonab Development AB, Vallingby, Sweden

[22] Filed: Dec. 5, 1972

[21] Appl. No.: 312,373

[30] Foreign Application Priority Data

Dec. 6, 1971 Sweden ............................ 15641/71

[52] U.S. Cl. ................. 325/492, 325/322, 325/466, 340/309.1, 340/311

[51] Int. Cl. ............................................ H04b 1/06

[58] Field of Search ....................... 325/55, 64, 466, 325/492, 322; 328/260; 340/309.1, 311

[56] References Cited

UNITED STATES PATENTS 3,651,413 3/1972 Wycoff .............................. 325/492

*Primary Examiner*—Albert J. Mayer
*Attorney*—Eric H. Waters et al.

[57] ABSTRACT

A device for decoding a predetermined sequence of a predetermined number of consecutive tone signals having predetermined frequencies and modulated on a carrier signal is in particular intended to be used as a call signal decoder in receivers in a wireless communication system, in which the receivers are called selectively by means of call signals in the form of tone sequence codes. The decoding device is normally in an inactive state with no power supply voltage connected to its various circuits and consequently with a very low power consumption. The device is put into an active operative state under the influence of the appearance of the carrier signal and remains thereafter in this active state for a time interval during which only the first tone signal in the tone signal sequence modulated on the carrier signal can appear. If this first tone signal is not in conformity with the predetermined tone signal sequence which the decoding device is pre-set to decode, the device is automatically returned to its inactive state. If, on the other hand, the first tone signal is in conformity with said predetermined tone signal code, the device is held in its active operative state for an additional time interval, during which the next tone signal in the tone signal sequence modulated on the carrier signal can appear, and so on, until all tone signals in the tone sequence modulated on the carrier signal have been received.

9 Claims, 4 Drawing Figures

DECODING DEVICE FOR TONE SEQUENCE CODES

BACKGROUND OF THE INVENTION

1. Field of the Invention

The present invention is related to a device for detecting or decoding a given sequence of consecutive tone signals having predetermined frequencies, which is modulated on a carrier signal. The device is primarily intended for use as a cell signal decoder in receivers in wireless communication systems, as for instance communication radio systems, wireless paging systems, remote control systems, data communication systems and the like, which comprise a plurality of receivers which can be called selectively from a central transmitter station in that the transmitter station transmits a predetermined call signal or call code, which is individually assigned to the receiver being called and which consists of a sequence of a predetermined number of consecutive tone signals having predetermined frequencies, which are modulated on a carrier signal. By transmitting for each call for instance a sequence of three consecutive tone signals, each of which can be given any one of for instance ten different frequencies, it becomes possible to call 1,000 different receivers selectively.

In a communication system of this type each receiver must be provided with a call signal decoder which is capable of analysing and decoding the sequence of consecutive tone signals being transmitted from the transmitter station, when a receiver is called, and to determine whether this sequence of consecutive tone signals is identical with the predetermined tone signal code which has been individually assigned as a call signal to the receiver concerned.

DESCRIPTION OF THE PRIOR ART

As such a call decoder it has been suggested in the prior art to use a device comprising a frequency discriminating unit, which can be switched between the frequencies of the different consecutive tone signals in the tone signal sequence, that is in the call signal code, which the device has to decode, and to which the received tone signals are supplied and which is adapted to produce an output signal when a tone signal occurs on the input having the frequence on which the frequency discriminating unit is actually set, and a logic control unit responsive to the output signals of the frequency discriminating unit for controlling the frequency switching of the frequency discriminating unit in such a way that in a starting state for the decoding operation the frequency discriminating unit is set on the frequency for the first tone signal in the tone signal sequence to be decoded and after the reception of a tone signal with this frequency and thus the occurrence of an output signal from the frequency discriminating unit is switched to the frequency for the second tone signal in the tone signal sequence to be decoded and so on, until all consecutive tone signals in the tone signal sequence to be decoded have been received, and for producing after the reception of the last tone signal in the tone signal sequence to be decoded an output signal constituting a criterion on the complete and correct reception of the tone signal sequence individually assigned to the particular call decoder.

SUMMARY OF THE INVENTION

The object of the present invention is to provide an improved device of the kind described above for decoding a sequence of consecutive tone signals, which device has improved safety against decoding errors and a reduced power consumption and which makes it possible in a simple way to call not only individual receivers but also predetermined groups of several receivers simultaneously.

For this object the invention provides a device for decoding a given sequence of a given number of consecutive tone signals with predetermined frequencies modulated on a carrier signal, in particular for receivers in wireless communication systems with selective calling by means of tone sequence codes, comprising frequency discriminating means which can be switched selectively between said predetermined frequencies and have an input to which said tone signals are supplied and are adapted to provide an output signal on an output on the occurrence of a tone signal on said input having the frequency on which the frequency discriminating means are actually set; logic control means responsive to the output signals of said frequency discriminating means for controlling the frequency switching of said frequency discriminating means in such a manner that in a starting state for the decoding process the frequency discriminating means is set on the frequency of the first tone signal in said tone signal sequence and after the occurrence of a tone signal with this frequency on the input of the frequency discriminating means is switched to the frequency of the second tone signal sequence and so on, until all consecutive tone signals in said predetermined tone signal sequence have occurred, and for producing after the occurrence of the last tone signal in said tone signal sequence an output signal constituting a criterion on the correct reception of said sequence of consecutive tone signals; switching means for connecting a power supply voltage to said frequency discriminating means and said logic control means; and time control means for closing and maintaining said switching means closed for a predetermined limited time interval after an activation of said time control means, said time interval having such a length that only a single tone signal in said tone signal sequence can occur during said time interval, and said time control means being responsive to the carrier signal and said output signals from said frequency discriminating means so as to be activated on the first occurrence of said carrier signal and subsequently on each occurrence of an output signal from said frequency discriminating means.

In a device according to the invention the power supply is not closed until on the appearance of a carrier signal and is subsequently maintained closed only for a limited time interval, during which only a single tone signal can appear, unless the tone signal received on the carrier signal during said time interval is identical with the corresponding tone signal in the tone signal sequence to be decoded by the device. This gives the advantage that the total average power consumption of the device will be very small, even if no special power-saving circuits or components are used in the device. This is of particular advantage when using a device according to the invention in portable receivers which are powered from batteries. Another important advantage of the device according to the invention is its improved safety against decoding errors, as the power supply is automatically interrupted so that the decoding device is rendered un-operative, if a tone signal is received which is not in conformity with the corresponding tone signal in the specific tone signal sequence to be decoded by the device. In such a case any subsequent tone signals will be unable to influence the decoding device.

A preferred embodiment of the decoding device according to the invention is provided with means for measuring the duration of the output signals from the frequency discriminating means and, if the duration of the output signals of the frequency discriminating means exceeds a predetermined minimum, initiating the logic control means to produce the output signal constituting a criterion on a correct reception of the tone signal sequence. This makes it possible in a very simple way to call simultaneously a predetermined group of several receivers, as will be described more in detail in the following.

BRIEF DESCRIPTION OF THE DRAWINGS

The invention and additional advantageous features thereof will be described more in detail in the following with reference to the accompanying drawings, which show by way of example a preferred embodiment of the invention. In the drawings

Figure 1:
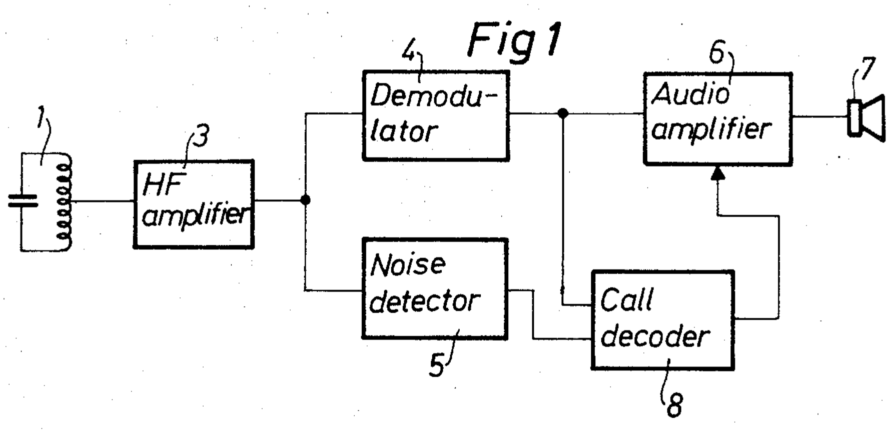
FIG. 1 shows by way of example and schematically a block circuit diagram for a receiver, for instance for a wireless paging system, including a call signal decoder according to the invention.

The receiver shown schematically and by way of example in FIG. 1 can for instance be a receiver in a wireless paging system and comprises an antenna circuit 1 for receiving the carrier signal which is transmitted from a central transmitter station and which is modulated with a specific tone signal sequence serving as a call signal for the individual receiver or group of receivers being called, as described in the foregoing, and thereafter with the information to be transferred to the called-up receiver or group of receivers, that is in the present example for instance with a speech signal. As mentioned in the foregoing and as schematically illustrated by the waveform I in FIG. 4, a call signal for the calling of an individual receiver may for instance consist of a sequence of three consecutive tone signal pulses A, B and C of predetermined length and predetermined time spacing and each having a predetermined tone frequency $f_A$, $f_B$ and $f_C$ respectively, selected amoung for instance ten different possible tone frequencies, It is appreciated that by the use of such sequences of consecutive tone signals it is possible to call 1,000 different receivers selectively. The dot-and-dash line 2 in FIG. 4 indicates the starting of the carrier signal on which the tone signal sequence A, B, C is modulated.

The modulated carrier signal is picked-up by the antenna circuit 1 in the receiver in FIG. 1 and amplified in a high frequency amplifier 3 and thereafter connected on the one hand to a demodulator 4 and on the other hand to a carrier responsive circuit, which in the illustrated example consists of a noise detector or squelch 5. The output from the demodulator 4 consists consequently of the signals which are modulated on the received carrier wave and which consequently consist initially of the tone signal sequence transmitted as a call signal and subsequently of a speech signal. The demodulated signals from the output of the demodulator 4 are conveyed to an audio amplifier 6, which has its output connected to a loudspeaker 7. The audio amplifier 6 is normally cut-off, however, so that no audio signals are transferred to the loudspeaker 7, but can be opened in response to a signal from a call decoder 8.

The noise detector or squelch 5 senses the presence of the carrier signal and produces a signal on its output to the call decoder 8, when carrier signal is received. It should be noticed that with respect to the present invention, which concerns the design of the call decoder 8, it is of course possible instead of a squelch 5 to use any other suitable circuit which can sense and indicate the presence of a carrier signal. The output signal from the squelch 5, which indicates the presence of a carrier signal, activates the call decoder 8, which receives also the demodulated tone signals from the output of the demodulator 4. As described in the foregoing, this tone signals consist of a specific sequence of consecutive tone signal pulses, which is used for a call signal to the wanted receiver. This tone signal sequence is detected or decoded in the call decoder 8 which, if the received tone signal sequence is in conformity with the predetermined tone signal sequence to be used for a call to the receiver concerned, produces an output signal, which opens the audio amplifier 6 so that a signal path is established from the demodulator 4 to the loudspeaker 7 for the information signals following after the call signal.

Figure 2:
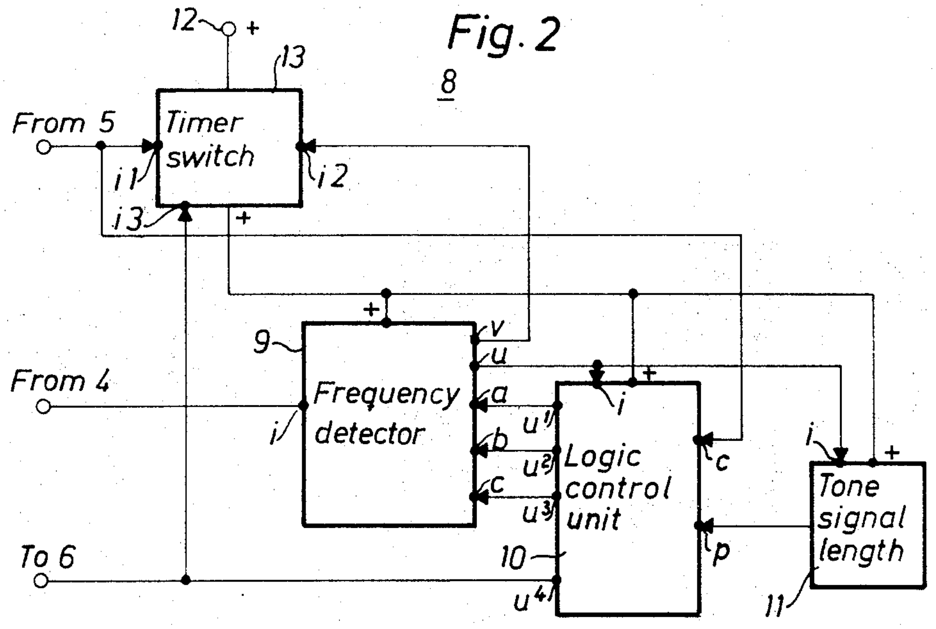
FIG. 2 shows a block circuit diagram for the call decoder according to the invention included in the receiver shown in FIG. 1.

FIG. 2 shows a block circuit diagram for the call decoder 8 according to the invention. This comprises a frequency discriminating unit or frequency detector 9, for instance consisting of a band-pass filter and a detector connected to the output of the filter. This frequency detector 9 receives on its input the demodulated tone signals from the demodulator 4 and can be switched selectively between the frequencies $f_A$, $f_B$ and $f_C$ of the different tone signals A, B and C respectively in the tone signal sequence which is assigned to be used as a call signal for the receiver concerned. For this switching or changing between different frequencies the frequency detector 9 is provided with three corresponding control inputs *a*, *b* and *c* so that by application of a suitable control signal to any one of these control inputs the frequency detector 9 can be set on the corresponding tone frequency $f_A$, $f_B$ and $f_C$ respectively. If a tone signal is received on the signal input *i* of the detector 9 having the frequency on which the detector 9 is presently set, the detector produces an output signal on an output *u* as well as on an output *v*. These output signals have substantially the same length or duration as the tone signal received on the input *i*.

The control signals necessary for the switching or changing of frequency in the frequency detector 9 are generated by a logic control unit 10, which is responsive to the output signals on the output *u* of the frequency detector 9, which is connected to the input *i* of the control unit 10. The control unit 10 has three outputs u1, u2 and u3 for control signals to the frequency detector 9 and a fourth output u4 for the output signal to the audio amplifier 6. The control unit 10 has also an additional input *c*, which receives the output signal from the squelch 5.

The control unit 10 is of such a design that it can assume four different states corresponding to generation of an output signal on the corresponding output u1, u2, u3 and u4 respectively. When a carrier signal is received and as a consequence thereof the squelch 5 applies a signal on the input *c* of the control unit 10, the control unit will assume its first state, in which an output signal is produced on the output u1, whereby the frequency detector 9 is switched to the frequency $f_A$ for the first tone signal A in the tone signal sequence assigned as a call signal for the receiver. If the first tone signal pulse modulated on the received carrier wave has this frequency, the frequency detector 9 produces an output signal on its output *u* and thus on the input *i* of the control unit 10. In response to this signal, or more exactly to the termination of the signal, the control unit 10 is transferred to its second state, in which a signal is produced on its output u2, whereby the frequency detector 9 is switched to the frequency $f_B$ for the second tone signal B in the tone signal sequence assigned as a call signal for the receiver. If the next tone signal pulse modulated on the receiver carrier wave has this frequency $f_B$, a second signal is produced on the output *u* of the frequency detector 9 and thus on the input *i* of the control unit 10. In response to the termination of this signal the control unit 10 is transferred to its third state, in which a signal is produced on its output u3, whereby the frequency detector 9 is switched to the frequency $f_C$ for the third tone signal pulse C in the tone signal sequence used as a call signal for the receiver. If the third tone signal pulse on the received carrier wave has this frequency $f_C$, which obviously means that the call transmitted from the transmitter station is intended for the receiver concerned, a signal is once more produced on the output *u* of the frequency detector 9. In response to the termination of this signal the control unit 10 is transferred to its fourth state, in which an output signal is produced on its output u4. This output signal constitutes a criterion on the fact the call transmitted from the transmitter station and just received by the receiver is actually intended for this receiver, wherefore this signal on the output u4 of the control unit 10 is transferred to the audio amplifier 6 as an opening signal therefore, as described in the foregoing.

The logic control unit 10 is also provided with an additional input *p* and, in response to control signal received on this input *p*, adapted to assume its fourth state and consequently to produce an output signal on its output u4 independently of the actual state of the control unit 10 when receiving the control signal on the input *p*. In this way it is consequently possible to obtain an opening signal for the audio amplifier 6, even if the complete tone signal sequence A, B, C assigned as an individual call signal for the receiver concerned has not been received.

The control signal on the input *p* of the control unit 10 is generated by a circuit 11, which on its input *i* receives the signals on the output *u* of the frequency detector 9 and which is adapted to measure the duration of length of these signals and to apply a signal to the input *p* of the control unit 10, when a signal appearing on the output *u* of the frequency detector 9 has a duration or length exceeding a predetermined minimum. The circuit 11 is not activated by the normal length of the tone signal pulses in the waveform I in FIG. 4, but it will be activated by a considerably prolonged tone signal pulse, as for instance the tone signal B in the waveform II in FIG. 4, which illustrates the waveform for a call signal used for group calls, i.e. the calling of several receivers at the same time. This call signal comprises only a first tone-signal A with the normal length and the frequency $f_A$ and a second, prolonged tone signal pulse B with the frequency $f_B$. From the foregoing it is appreciated that the first tone signal pulse A will cause the frequency detector 9 to be switched to the frequency $f_B$, wherefore the second, prolonged tone signal pulse B will produce a correspondingly prolonged output signal on the outout *u* of the frequency detector 9. In response to this prolonged signal on the output *u* of the frequency detector 9 the circuit 11 produces a signal on the input *p* of the control unit 10, whereby the control unit 10 is transferred to its fourth state and produces an output signal on its output u4 to the audio amplifier 6. It is appreciated that a call signal with the waveform II in FIG. 4 will open all receivers having call tone codes comprising a first signal pulse with the frequency $f_A$, a second signal pulse with the frequency $f_B$ and a third signal pulse C with any arbitrary frequency. In the example of the invention discussed herein, for which it has been assumed that each of the frequencies $f_A$, $f_B$ and $f_C$ can have any one of 10 different frequency values, a call signal with the wave form II in FIG. 2 can obviously be used for calling and opening a specific group of 10 receivers at the same time.

Figure 4:
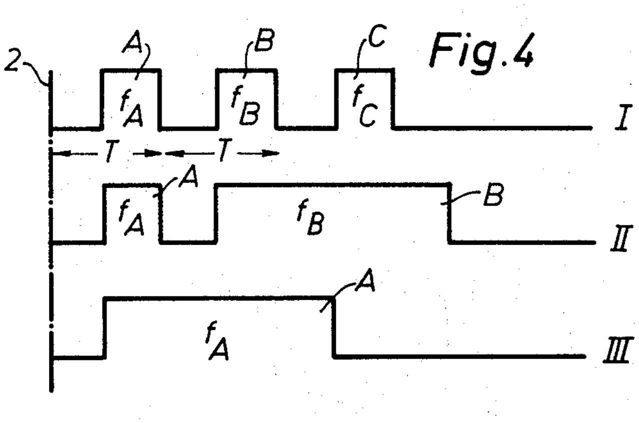
FIG. 4 is a diagram illustrating the wave form of the tone signal sequences being transmitted for calling an individual receiver and for calling simultaneously a predetermined group of several receivers respectively, when using the call decoder according to the invention illustrated in FIG. 3.

By using a call signal having the waveform III in FIG. 4, which consists only of a first prolonged tone signal A with the frequency $f_A$, it is obviously possible in a similar manner to call and open at the same time all those receivers that have individual call tone codes, in which the first tone signal A has the frequency $f_A$. In the example of the invention described herein, such a call signal can be used for calling a group of 100 receivers at the same time.

As illustrated in FIG. 2, both the frequency detector 9 and the logic control unit 10 as well as the circuit 11 receive their power supply from a power input terminal 12, to which a non-illustrated power voltage source is connected, through a unit 13, which is a power voltage switch, which can connect the power supply voltage on the terminal 12 to the frequency detector 9, the logic control unit 10 and the circuit 11. As long as no carrier wave is received, the switch 13 is open, wherefore no power supply voltage is connected to any one of the units 9, 10 and 11. Under these conditions the call decoder 8 is inactive and has substantially no power consumption, which is very advantageous in a portable battery-powered receiver. When the receiver starts to receive a carrier signal, the switch 13 is closed in response to the output signal from the squelch 5, which indicates the presence of a carrier signal, and which is connected to a control input i1 for the switch 13. The switch 13 closes and connects the necessary power supply voltage to the units 9, 10 and 11, whereby the call decoder 8 can start the decoding of the call tone code modulated on the received carrier signal in the manner described in the foregoing.

The switch unit 13 includes also a timing circuit, which reopens the switch automatically after a predetermined time interval 10 after the closing of the switch. This time interval T, i.e. the delay time for the timing circuit in the switch unit 13, is selected to correspond at least to the time interval from the beginning of the carrier signal to the first tone signal or between two subsequent tone signals respectively in the tone signal sequence used as a call signal but to be shorter than the triple of said time interval, as illustrated in FIG. 4. Consequently, the power supply switch 13 is closed in response to the occurrence of the carrier wave at the instant 2 in FIG. 4 and is subsequently kept closed for a time interval T, during which only the first tone signal pulse A in the tone signal sequence transmitted from the transmitter station can appear. If this first tone signal pulse does not have a frequency in conformity with the specific tone signal sequence assigned as a call signal for the receiver concerned, the power supply switch 13 will automatically be re-opened after the time interval T so as to disconnect the power supply from the units 9, 10, 11, whereby the code decoder 8 is returned to its inactive state. If on the contrary the first tone signal pulse A is in conformity with the predetermined tone signal sequence assigned as a call signal for the receiver concerned, a corresponding signal is produced on the output *v* of the frequency detector 9, as described in the foregoing. This signal is supplied to a second control input i2 of the power supply switch 13, which is kept closed under the influence of this signal at the same time as the timing circuit in the switch unit is restarted so that the switch 13 will remain closed for an additional time interval T. It is appreciated that in this way the call decoder 8 is kept operative for receiving and detecting also the second tone signal pulse B on the received carrier signal. If this second tone signal pulse does not conform with the predetermined tone signal sequence assigned as a call signal for the receiver concerned, the power supply switch 13 will be opened so that the code decoder 8 is returned to its inactive state. If on the contrary also the second tone signal B is in conformity with the predetermined tone signal sequence to be serving as a call for the receiver, a signal is once more applied to the input i2 of the switch unit 13 from the output *v* of the frequency detector 9, whereby the switch 13 is kept closed for an additional time interval T and the call decoder 8 is kept operative for detecting also the third tone signal pulse C on the received carrier signal.

From the foregoing it is realized that the call decoder 8 is kept in operation only as long as it receives and detects tone signal pulses which are in conformity with the predetermined tone signal sequence assigned to be used as a call signal for the receiver concerned. As soon as a tone signal pulse is received and detected, which is not in conformity with said predetermined tone signal sequence, the call decoder 8 is returned to its inactive state and can thereafter not be affected by any subsequent tone signal pulses. In this way, a substantially increased safety against an erroneous decoding of the transmitted tone signal sequence and also a considerable reduction of the total power consumption of the call decoder 8 is obtained.

If the received tone signal sequence is in conformity with the predetermined tone signal sequence assigned to be used as a call signal for the receiver concerned, an output signal is produced on the output u4 of the logic control unit 10, as described in the foregoing, and this output signal opens the audio amplifier 6 between the demodulator 4 and the loudspeaker 7. As illustrated in FIG. 2, this signal on the output 4 of the control unit 10 is also connected to a third input i3 of the switch unit 13, which is kept permanently closed in response to this signal as long as the signal is present on the input i3.

When the carrier wave from the transmitter station disappears, that is when the established connection to the called-up receiver is interrupted, this is indicated on the output of the squelch 5 and thus on the input *c* of the control unit 10. In response to this changed signal state on its input *c* the control unit 10 is reset to its initial first state, in which the control unit produces a signal on its output u1 and not on the output u4. As a consequence also the signal on the input i3 of the switch unit 13 is removed, whereby the switch 13 is opened to interrupt the power voltage supply to the units 9, 10 and 11. This means that the call decoder 8 returns to its inactive state and will remain in this state until a carrier wave is once more received.

Figure 3:
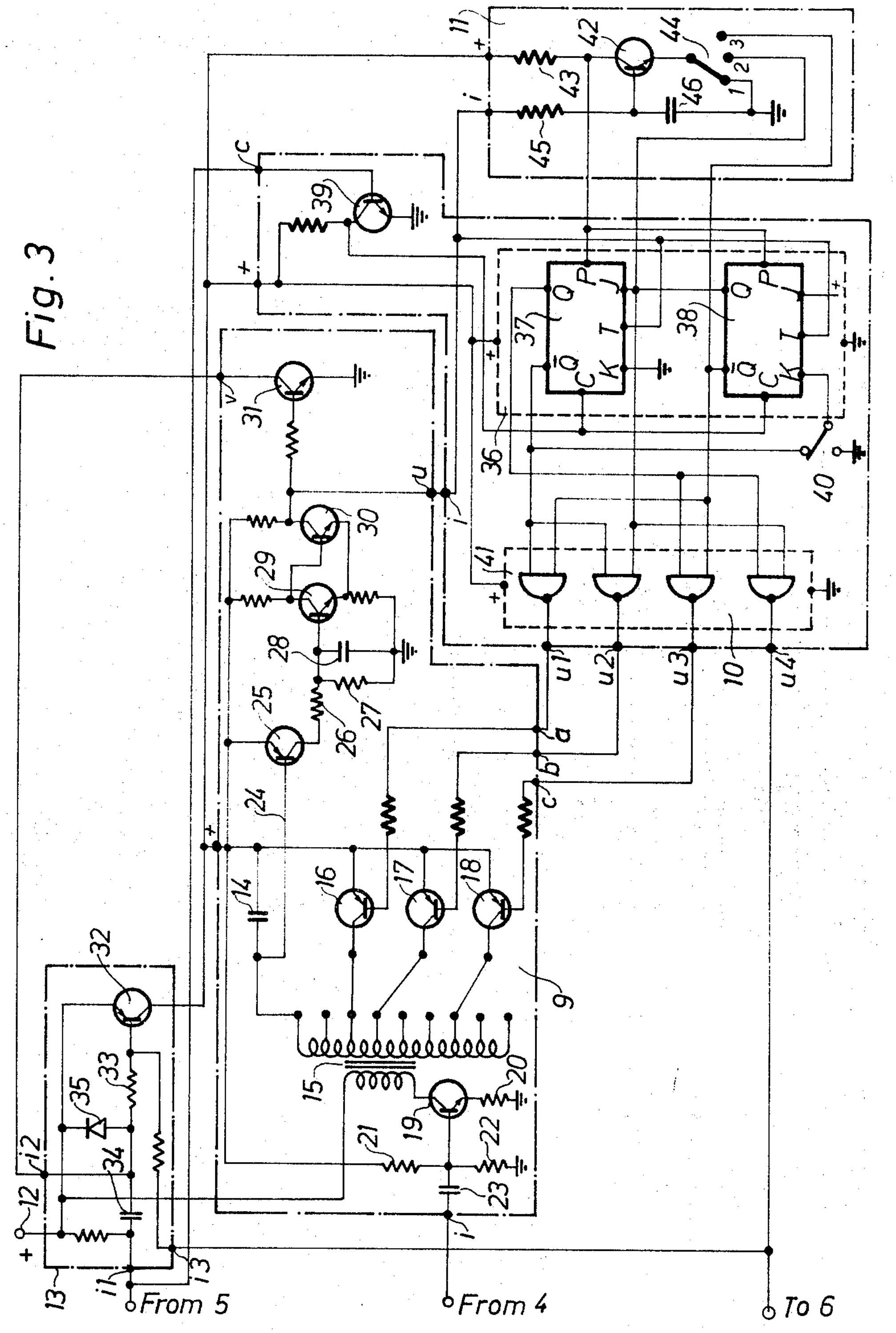
FIG. 3 shows in greater detail a circuit diagram for the call decoder according to the invention shown in FIG. 2.

FIG. 3 shows in greater detail and by way of example a circuit diagram for an embodiment of the call decoder according to the invention shown in FIG. 2. In FIG. 3 the different units 9, 10, 11 and 13 of the decoder are shown within dash-dotted frames provided with the same reference numerals. The decoder illustrated in FIG. 3 includes a number of binary logic circuits and elements and it is assumed that a binary "1" is represented by positive potential, whereas a binary "0" is represented by earth potential. Further, it is assumed that the squelch 5 indicates the presence of a carrier wave by means of a "0," that is earth potential, on its output and the absence of carrier wave by means of a "1," that is positive potential, on its output.

The frequency detector 9 in the embodiment of the invention illustrated in FIG. 3 comprises a band-pass filter, which can be switched between a number of different frequencies and which is of the type described in greater detail in the Swedish Pat. application No. 15640/71. This band-pass filter comprises a parallell resonance circuit consisting of a capacitor 14 and the secondary winding of a tone frequency transformer 15 and which can be switched selectively between three different frequencies by means of switch transistors 16, 17 and 18, which have their bases connected through associated base resistors to the control input terminals *a, b* and *c* respectively, of the frequency detector 9. The resonance circuit is fed through the primary winding of the transformer 15 from a constant current source including a transistor 19 with an emitter resistor 20 and base biasing resistors 21 and 22. This constant current source is controlled through a capacitor 23 by the tone signal supplied to the input *i* of the frequency detector 9 from the demodulator 4.

The output signal of this band-pass filter on the conductor 24 is detected by the base-emitter junction of a transistor 25, which has a collector circuit including an integrating RC net 26, 27, 28. The resulting voltage pulse is connected to a Schmitt trigger consisting of two transistors 29 and 30, whereby consequently on the collector of the transistor 30 a positive voltage pulse is produced having substantially the same length as the tone signal pulse applied on the input of the band-pass filter. The collector of the transistor 30 is connected to the output *u* of the frequency detector 9, wherefore the positive voltage pulse produced on the collector of the transistor 30, when a correct tone signal pulse is received, is transferred on the one hand to the input *i* of the logic control unit 10 and on the other hand to the input *i* of the signal length measuring circuit 11. The positive voltage pulse on the collector of the transistor 30 makes also a transistor 31 conductive, wherefore a pulse of corresponding length and with substantially earth potential is produced on the collector of the transistor 31. The collector on the transistor 31 is connected to the output *v* of the frequency detector 9 and thus to the input i2 of the power supply switch 13.

The power supply switch 13 comprises a transistor 32, which has its emitter connected to the power input terminal 12 and thus to the non-illustrated power supply source and its collector connected to the power supply inputs of the units 9, 10 and 11 respectively. The base of the transistor 32 is connected through a RC net 33, 34 to the input i1, to which the output signal from the squelch 5 is supplied. When no carrier wave is received and the squelch consequently provides a "1," that is positive potential, on its output, the transistor 32 is cut-off or non-conducting, wherefore no power supply voltage is transferred through the transistor to the units 9, 10 and 11. When a carrier wave appears and in response thereto the output signal from the squelch 5 becomes "O" so that earth potential is applied to the input i1 of the power voltage switch 13, the transistor 32 starts to conduct and connects the power supply voltage from the terminal 12 to the units 9, 10, 11. At the same time a charging of the capacitor 34 is initiated through the base-emitter junction of the transistor 32 and the resistor 33. This causes the transistor 32 to be cut-off or rendered non-conducting after a time interval determined by the time constant of the charging circuit, whereby the power supply to the units 9, 10 and 11 is interrupted. The time constant of the charging circuit for the capacitor 34 is selected with consideration to the time interval T in the manner described in the foregoing. If during this time interval, when the transistor 32 is still conducting, the transistor 31 in the frequency detector 9 is made conductive in response to a positive voltage pulse on the collector of the transistor 30, the capacitor 34 will be discharged through the transistor 31. The transistor 32 in the power voltage switch 13 is consequently kept conducting as long as the transistor 31 conducts, and when the transistor 31 is once more rendered non-conducting, the transistor 32 will still be kept conducting during a new charging period of the capacitor 34, provided that a carrier wave is still present. If earth potential is applied to the input i3 of the power voltage switch 13 from tge output u4 of the logic control unit 10, the transistor 32 will also be kept conducting as long as this earth potential is present on the input i3. When the earth potential on the input i3 is subsequently replaced by a positive potential, the transistor 32 is cut-off and the power supply to the unit 9, 10 and 11 interrupted. When the carrier wave ends and as a consequence thereof positive potential is applied to the input i1 of the power voltage switch 13, the capacitor 32 is discharged through a diode 35.

The logic control unit 10 comprises a 2-bit shift register 36, preferably in the form of an integrated circuit. This shift register includes two identical binary flip-flops 37 and 38. Each of these flip-flops has two complementary outputs Q and $\overline{Q}$ and a trigger input T for drive pulses. Each flip-flop has also two inputs K and J for determining the state the flip-flop will assume in response to a drive pulse on the trigger input T. The flip-flops operate according to following rules: With "1" on terminal K and "0"on terminal J a drive pulse on trigger terminal T brings the flip-flop to the state $\overline{Q}$ = 1. With "1" on terminal J and "0" on terminal K a trigger pulse on terminal T brings the flip-flip to the state $Q = 1$. With "1" on terminal K as well as terminal J each trigger pulse on terminal T causes a change of state of the flip-flop. With "0" on terminal K as well as terminal J a trigger pulse on terminal T has no effect on the state of the flip-flop. Each flip-flop has additionally a re-set input C and a "0" signal supplied to this re-set input C resets the flip-flop independently of its previous state so that the flip-flop provides "1" on output $\overline{Q}$ and "0" on output Q. Finally each flip-flop has a preset input terminal P such that a "0" on this preset input P transfers the flip-flop to its 1-state giving "1" on output Q and "0" on output $\overline{Q}$.

The trigger input terminals T of the flip-flops 37 and 38 are connected to the input *i* of the control unit 10 and receive consequently the positive pulses on the output *u* of the frequency detector 9. The flip-flops are designed to be triggered by the trailing edges of said pulses. The reset inputs C of the flip-flops are connected to the collector of a transistor 39, which has its collector connected through a resistor to the supply voltage and its base connected to the output of the squelch 5. With no carrier wave present the transistor 39 is consequently conducting and a "0" is applied in the reset inputs C of the flip-flops 37, 38. When a carrier wave appears and earth potential is connected to the base of the transistor 39, the transistor 39 is made non-conducting, whereby a "1" is provided on the reset inputs C of the flip-flops 37, 38. Due to existing time delays, however, this does not occur until after the connection of the power supply voltage to the control unit 10 and thus to the shift register 36 and the flip-flops 37, 38 through the power supply switch 13, wherefore the flip-flops 37 and 38 will have time to be reset when the carrier wave appears.

With the illusrated interconnections between the two flip-flips 37 and 38 and with the switch 40 in its illustrated position, the shift register 36 will assume the states given in the following table during the decoding of a sequence of three tone signals A, B, C:

| | Flip-flop 37 | | Flip-flop 38 | | 0 on |
|---|---|---|---|---|---|
| | Q | $\overline{Q}$ | Q | $\overline{Q}$ | |
| start of carrier | 0 | 1 | 0 | 1 | u1 |
| after tone pulse A | 0 | 1 | 1 | 0 | u2 |
| after tone pulse B | 1 | 0 | 0 | 1 | u3 |
| after tone pulse C | 1 | 0 | 1 | 0 | u4 |

In the last state, which is reached on reception of the third tone signal pulse C, the shift register 36 cannot be affected by any additional trigger pulse on the trigger inputs T.

The state of the shift register 36 is decoded by a decoder 41 consisting of four nand-gates, which have their outputs connected to the outputs u1, u2, u3 and u4 respectively of the control unit 10. It is appreciated that "0" is provided on these outputs u1 to u4 in accordance with the above table. The output u1, u2 or u3 presently having a "0" renders its associated transistors 16, 17 or 18 respectively in the band-pass filter in the frequency detector 9 conducting and switches consequently the band-pass filter to the corresponding frequency. The "0" signal on the output u4 opens, as described in the foregoing, the audio amplifier 6 and locks the power voltage switch 13 in its closed state. When the carrier wave disappears, i.e. when the established connection to the receiver is interrupted, this is indicated by the appearance of positive potential on the output of the squelch 5, whereby the transistor 39 is rendered conducting and "0" is provided on the reset inputs C of the flip-flops 37 and 38. In response thereto the flip-flops are reset and the "0" on the output u4 is replaced by a "1." As a consequence the power supply switch 13 is opened and the power supply to the units 9, 10 and 11 interrupted.

If the switch 40 is switched to its other position, the operation of the shift register 36 is changed in such a way that the two flip-flops 37 and 38 assume the state $Q = 1$, whereby a "0" is provided on the output u4, already after the reception of only two tone signal pulses. In this way the call decoder can be used for the decoding of tone signal sequences comprising only two consecutive tone signals, that is for a system with selective calling of 100 receivers at a maximum. In this connection it is appreciated that the device can also be designed for decoding tone signal sequences containing more than three consecutive tone signals, that the number of switch transistors in the band-pass filter is increased and the logic control unit 10 is expanded to be capable of assuming a corresponding larger number of different states.

The circuit 11 for measuring the length of the tone signals comprises a transistor 42, which has its collector connected to the preset inputs P of the flip-flops 37, 38 and through a resistor 43 to the power supply voltage. The emitter of the transistor is connected to a switch 44 having three alternative positions, through which the emitter can be connected alternatively to earth, to the output Q of the flip-flop 38 or the output $\overline{Q}$ of the flip-flop 38 respectively. The base of the transistor 42 is connected to an integrating RC net 45, 46, which receives the positive voltage pulses on the collector of the transistor 30 in the frequency detector 9. The positive voltage pulse appearing on the collector of the transistor 39 upon reception of a tone signal pulse charges the capacitor 46 and if the tone signal is prolonged, as for instance the tone pulse B in the waveform II or the tone pulse A in the waveform III in FIG. 4, the capacitor 46 will have time to be charged to such a voltage that the transistor 42 is rendered conducting so as to provide a "0" on the preset inputs P of the flip-flops 37, 38, whereby the shift register 36 is transferred to the state giving a "0" on the output u4 of the control unit 10.

With the switch 44 in the illustrated position the circuit 11 measures the length of all tone signal pulses being received. If the switch 44 is in the position 2 on the other hand, the emitter of the transistor 42 is connected to earth potential only when the first tone signal pulse in a tone signal sequence is being received, wherefore only a prolongation of this first tone signal can activate the circuit 11. Consequently, this position of the switch 44 is used, if group calls are used only for groups of receivers having the first tone signal pulse in common. With the switch 44 in position 3 the emitter of the transistor 42 is connected to earth only when the second tone pulse in a tone signal sequence is being received, wherefore the circuit 11 can only measure a prolongation of this second tone pulse. Consequently, this position of the switch 44 is used, if group calls are used only for groups of receivers having the second tone signal in common.

Although FIG. 3 illustrates a preferred embodiment of a device according to the invention, it is appreciated that a very large number of other embodiments are possible within the scope of the invention, for instance with other types of circuits in the frequency detector 9, the logic control unit 10, the pulse length measuring circuit 11 and the power supply switch 13. It is also appreciated that the actual design of the device according to the invention will depend on the number of tone signals in the tone signal sequence to be decoded as well as on the number of different frequencies each of these tone signals can assume.

I claim:

1. A device for decoding a given sequence of consecutive tone signals of predetermined frequencies modulated on a carrier signal, in particular for a receiver in a wireless communication system with selective calling by means of tone sequence codes, comprising frequency discriminating means, which can be switched selectively between said predetermined frequencies and are provided with an input for receiving said tone signals and are adapted to generate an output signal on an output in response to a tone signal on said input having the frequency on which said frecuency discriminating means are actually set; logic control means responsive to said output signals of said frequency discriminating means for controlling the switching of said frequency discriminating means between said predetermined frequencies in such a manner that in a starting state for the decoding process said frequency discriminating means are set on the frequency of the first tone signal in said tone signal sequence and after an appearance of a tone signal with this frequency on said input of said frequency discriminating means are switched to the frequency of the second tone signal in said tone signal sequence and so on, until all consecutive tone signals in said given tone signal sequence have appeared on said input of said frequency discriminating means, and for generating an output signal constituting a criterion on a complete reception of said given sequence of consecutive tone signals after the appearance of the last tone signal in said tone signal sequence; switching means for connecting a power supply voltage to said frequency discriminating means and said logic control means; and timing means for closing and maintaining said switching means closed for a predetermined time interval after an activation of said timing means; said timing means being responsive to said carrier signal and said output signal from said frequency discriminating means so as to be activated by the initial appearance of said carrier signal and subsequently by each output signal from said frequency discriminating means; and said predetermined time interval having a duration within which only one tone signal in said tone signal sequence can appear.

2. A device as claimed in claim 1, wherein said timing means are responsive to said criterion output signal from said logic control means so as to be kept permanently activated under the influence of said criterion output signal, whereby said switching means are kept closed and said power supply voltage is maintained connected to said frequency discriminating means and said logic control means for the duration of said criterion output signal from said logic control means.

3. A device as claimed in claim 2, wherein said logic control means are responsive to the interruption of said carrier signal so as to return to said starting state under the influence thereof, whereby said criterion output signal from said logic control means is interrupted and the power supply voltage is disconnected from said frequency discriminating means and said logic control means.

4. A device as claimed in claim 1, wherein said logic control means are responsive to the appearance of said carrier signal so as to assume said starting state under the influence thereof.

5. A device as claimed in claim 1, comprising a signal length measuring circuit for measuring the duration of the output signals of said frequency discriminating means and for generating a signal when the length of an output signal from said frequency discriminating means exceeds a predetermined minimum, said logic control means being responsive to said signal generated by said signal length measuring circuit so as to generate said criterion output signal under the influence of said signal generated by said signal length measuring circuit, even if all normally appearing tone signals in said tone signal sequence have not been received.

6. A device as claimed in claim 5, wherein said signal length measuring circuit includes switching means for presetting said circuit to measure only the length of a certain output signal from said frequency discriminating means corresponding to a predetermined tone signal in said tone signal sequence.

7. A device as claimed in claim 1, wherein said logic control means include switching means for presetting said logic control means for the decoding of different numbers of tone signals in said tone signal sequence.

8. A device as claimed in claim 1, wherein said logic control means include a binary shift register for counting said output signals from said frequency discriminating means, and decoding circuit means for decoding the actual state of said shift register and for generating control signals for controlling said switching of said frequency discriminating means between said predetermined frequencies and for generating said criterion output signal.

9. A device as claimed in claim 1, wherein said frequency discriminating means include a band-pass filter, which can be switched selectively between the frequencies of said consecutive tone signals, said tone signals being applied to the input of said band-pass filter, and a detector circuit connected to the output of said band-pass filter.

* * * * *